United States Patent [19]
Gluskoter et al.

[11] Patent Number: 6,011,687
[45] Date of Patent: Jan. 4, 2000

[54] DOCKING STATION ADAPTER FOR COMPUTER MEDIA MODULES

[75] Inventors: Steve Gluskoter, Austin; Ed Cline, Cedar Park; Ed Tinsley, Austin; Orin M. Ozias, Cedar Park; Bryan Howell, Austin, all of Tex.; Bryan Hunter, Meridian, Id.; Damon Broder, Austin, Tex.

[73] Assignee: Dell U.S.A., L. P., Round Rock, Tex.

[21] Appl. No.: 09/018,262

[22] Filed: Feb. 4, 1998

[51] Int. Cl.⁷ ...................................................... G06F 1/16
[52] U.S. Cl. ............................................. 361/686; 361/685
[58] Field of Search ................................... 361/686, 685, 361/683

[56] References Cited

U.S. PATENT DOCUMENTS

| | | |
|---|---|---|
| 4,941,841 | 7/1990 | Darden et al. ............................ 361/685 |
| 5,211,566 | 5/1993 | Bates et al. ................................. 439/66 |
| 5,313,596 | 5/1994 | Swindler et al. . |
| 5,323,291 | 6/1994 | Boyle et al. ............................ 361/686 |
| 5,402,310 | 3/1995 | Penniman . |
| 5,452,180 | 9/1995 | Register et al. . |
| 5,526,493 | 6/1996 | Shu . |
| 5,527,104 | 6/1996 | Moss . |
| 5,568,359 | 10/1996 | Cavello et al. . |
| 5,580,107 | 12/1996 | Howell . |
| 5,586,003 | 12/1996 | Schmitt et al. . |
| 5,668,417 | 9/1997 | Wiscombe et al. . |
| 5,699,226 | 12/1997 | Cavello . |
| 5,764,481 | 6/1998 | Ruch et al. ............................. 361/685 |
| 5,896,273 | 4/1999 | Varghese et al. ....................... 361/683 |

OTHER PUBLICATIONS

U.S. application No. 08/696,459, O'Connor, filed Aug. 14, 1996. Computer Docking System Having an Electromagnetic Lock, Abstract, 5 sheets of drawings, and filing receipt.

U.S. application No. 09/018,262, Gluskoter et al., filed Feb. 4, 1998. Docking Station Adapter for Computer Media Modules, Abstract, 9 sheets of drawings, and filing receipt.

*Primary Examiner*—Leo P. Picard
*Assistant Examiner*—John D. Reed
*Attorney, Agent, or Firm*—Haynes and Boone, LLP

[57] ABSTRACT

A docking station adapter for portable computer media modules is described. In one embodiment, the docking station adapter includes a housing that is inserted into a expansion bay of a docking station and into which a media module is inserted, a flexible printed circuit ("FPC") including the necessary connectors for adapting a connector of the media module to a connector of the docking station disposed within the expansion bay, a mechanism for ejecting and removing the module from the adapter, and a mechanism for ejecting and removing the adapter from the expansion bay.

34 Claims, 5 Drawing Sheets

DOCKING STATION ADAPTER FOR COMPUTER MEDIA MODULES

TECHNICAL FIELD

One embodiment relates generally to docking stations for portable computers and, more particularly, to a docking station adapter for portable computer media modules.

BACKGROUND

Portable personal computers (PCs) were first introduced in the early 1980s and have since enjoyed great commercial success and consumer acceptance. As the portable PC market has grown, manufacturers have produced portable PCs with continually improved capabilities and displays and that are increasingly more powerful and faster than their predecessors. This trend has resulted in many users replacing the more traditional desktop PC with portable PCs as their primary or sole computing device.

Portable PCs, however, have certain disadvantages as compared to desktop PCs due to the size constraints necessary to make portable PCs portable. In particular, the keyboard attached to a portable PC is much smaller than those used in connection with desktop PCs, with both fewer keys resulting in less functionality, and smaller keys which hamper typing. Moreover, the attached portable PC keyboard is just that, attached, thereby causing the user to position the PC such that the keys are reachable and the display viewable. Such positioning requires the portable PC to be in a poor ergonomic orientation with respect to the user, resulting in user discomfort if used for long periods of time.

In addition, the height of the standard portable PC display requires the user to look down at a slight angle. Ergonomic desirability would have the user either looking horizontally or only slightly downward between approximately 0° and −15° (where 0° is horizontal). There is also a need to interface portable PCs with established PC networks to connect with common servers, electronic mail, modem pools and the like common in today's office environments.

To overcome some of these disadvantages associated with portable PCs, docking stations have been developed that provide portable PCs with a plurality of connectors via a port replicator to enable portable PCs to be interfaced with PC networks and desktop computer peripheral equipment, such as larger keyboards, detached mice, monitors, printers and the like. The port replicator replicates the connectors, or ports, typically found on desktop PCs that serve to connect the PC to a network or peripheral equipment. Thus, once docked with a docking station, such peripheral equipment or network connections can be interfaced with the portable PC. In this manner, the portable PC user can connect a full size keyboard to the portable PC to take advantage of the larger keys and enhanced functionality of such keyboards.

More recently, docking stations have been designed to include a receptacle, or bay, for receiving a removable media module of a portable computer to enable access to the module by a desktop computer or PC network via the docking station. Examples of common media modules include floppy disk drives ("FDDs") and CD ROM drives. Other examples include ZIP drives, removable media hard disk drives, and magneto-optical drives.

It will be recognized that different families of portable computers produced by a manufacturer will generally have different form factors. As a result, the form factors of the various modules thereof, including media modules, will also have different form factors. For this reason, each family of portable computers typically has associated therewith a docking station designed specifically for that family. Accordingly, the life of the docking station is limited by the life of the corresponding family of computers. In other words, each time a new family of portable computers is rolled out, a new docking station must also be designed and manufactured. Clearly, this process is expensive and time consuming.

Therefore, what is needed is an apparatus for extending the life of a portable computer docking station beyond the life of the family of portable computers with which it is initially associated.

SUMMARY

One embodiment, accordingly, provides a docking station adapter for portable computer media modules. In one embodiment, the docking station adapter includes a housing that is inserted into a expansion bay of a docking station and into which a media module is inserted, a flexible printed circuit ("FPC") including the necessary connectors for adapting a connector of the media module to a connector of the docking station disposed within the expansion bay, a mechanism for ejecting and removing the module from the adapter, and a mechanism for ejecting and removing the adapter from the expansion bay.

In one aspect, an alignment pin is provided at the rear of the expansion bay and connected directly to the main board of the computer. A corresponding slot is provided at the rear of the adapter such that the pin and slot ensure proper medium alignment.

In another aspect, EMI spring clips are provided on each of left and right side walls of the adapter for suppressing EMI emissions by returning signals to main system ground of the docking station. The EMI spring clips also serve to center the adapter within the expansion bay.

In another aspect, a finger grip is provided for manually completing the removal of the media module from the adapter after the media module has been ejected therefrom. Similarly, one or more finger grip means are provided for manually completing the removal of the adapter from the expansion bay after the adapter has been ejected therefrom.

In yet another aspect, a wall interior to the adapter is located such that it does not interfere with the insertion of a media module within the adapter, but prevents the insertion of a battery module within the adapter.

In yet another aspect, a fan, which is powered via a two wire connection to the main board of the docking station, is provided within the adapter for cooling a media module disposed therein.

A technical advantage achieved is that use of an adapter extends the life of a docking station by enabling a single large expansion bay to accommodate removable portable computer media modules of differing types and form factors by changing the design of the adapter, rather than the docking station.

Another technical advantage achieved is the provision of EMI spring clips on each of the two side walls of the adapter for suppressing EMI emissions and centering the adapter within the expansion bay.

Yet another technical advantage achieved is that a fan can be provided within the adapter for cooling high power-consumption media modules.

DESCRIPTION OF THE PREFERRED EMBODIMENT

Figures 1, 2A, 2B:
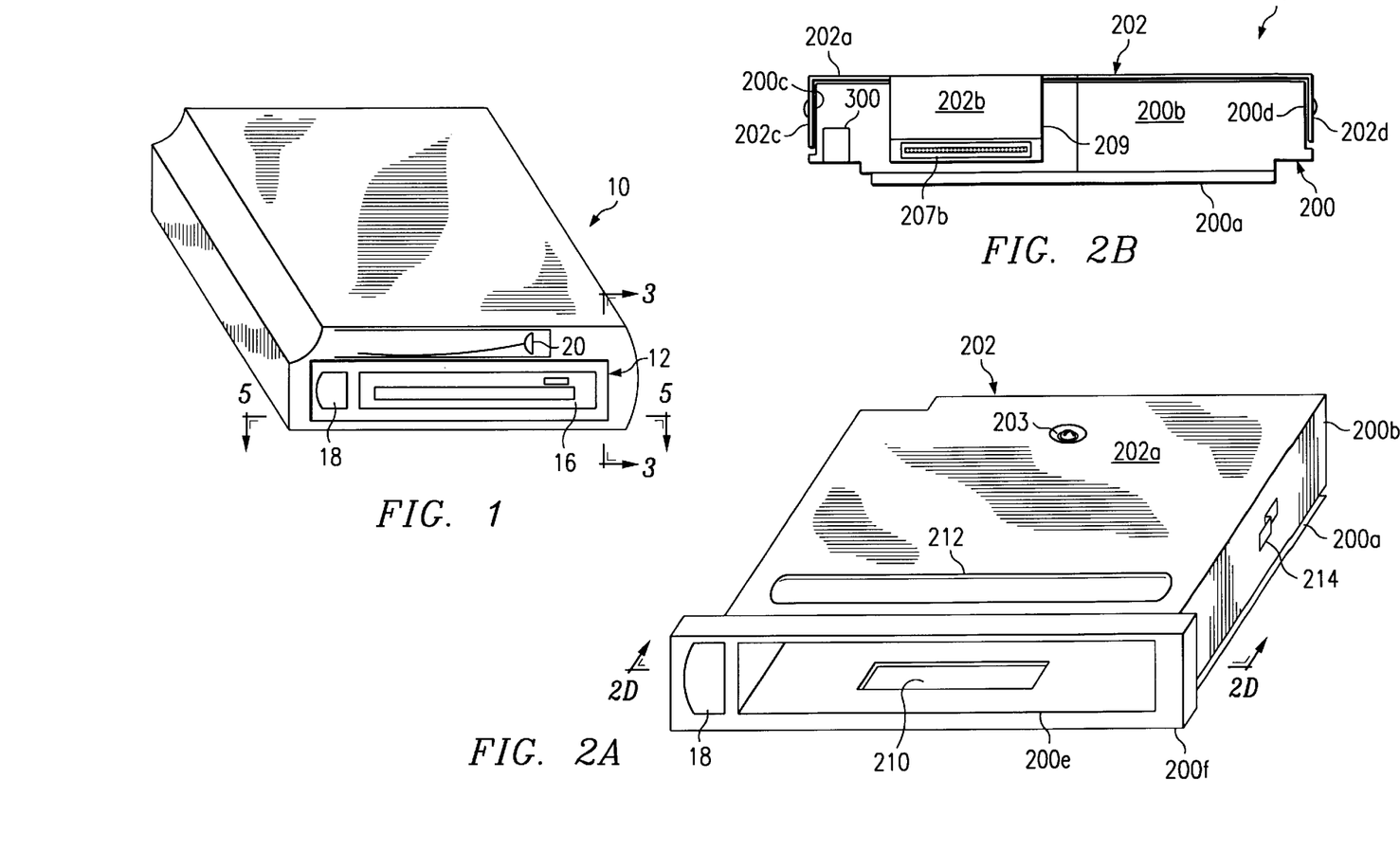
FIG. 1 is a perspective view of one end of a docking station having retained therein an adapter embodying features of one embodiment.
FIG. 2A is a perspective view of the adapter of FIG. 1.
FIG. 2B is a rear plan view of the adapter of FIG. 1.

FIG. 1 illustrates a docking station 10 including an expansion bay 12, which in the preferred embodiment is designed to accommodate some one inch form factor desktop computer devices and certain Device Bay devices. As will be described in greater detail below, an adapter 14 is configured to be inserted into and retained within the expansion bay 12 and to retain therewithin a removable portable computer media module 16. In the illustrated embodiment, the adapter 14 is designed to accommodate a floppy disk drive module 16; however, it will be recognized that adapters similar to the adapter 14 may be designed to accommodate other media modules, such as CD ROM drives, ZIP drives, removable media hard disk drives, and magneto-optical drives.

As will be described in greater detail below, the adapter 14 includes an eject button 18 for initiating the ejection of the module 16 from the adapter 14 using one of any number of different known ejection mechanisms. Similarly, the docking station 10 includes an eject mechanism 20 for ejecting the adapter 14 from the expansion bay 12.

Referring now to FIGS. 2A–2D, the design of the adapter 14 will be described in greater detail. In a preferred embodiment, the adapter 14 consists of a housing including a molded plastic base 200 and a sheet metal housing cover 202. The base includes a floor 200a and rear, left, and right side walls, respectively designated by reference numerals 200b, 200c, and 200d, each of which project upwardly from the floor 200a. An aperture 200e is provided in a front wall 200f of the base 200 for receiving an media module, such as the media module 16. The housing cover 202 includes a ceiling 202a and a rear wall portion and left and right side walls, respectively designated by reference numerals 202b, 202c, and 202d, projecting downwardly from the ceiling 202a. The housing cover 202 is connected to the base 200 using a screw 203.

A sheet metal floor cover 204, including a spring 205a and a detent 205b disposed on a top surface thereof for purposes that will be described in greater detail below, is disposed over the interior floor of the base 200 and attached thereto with a plurality of screws 206.

Figure 2C:
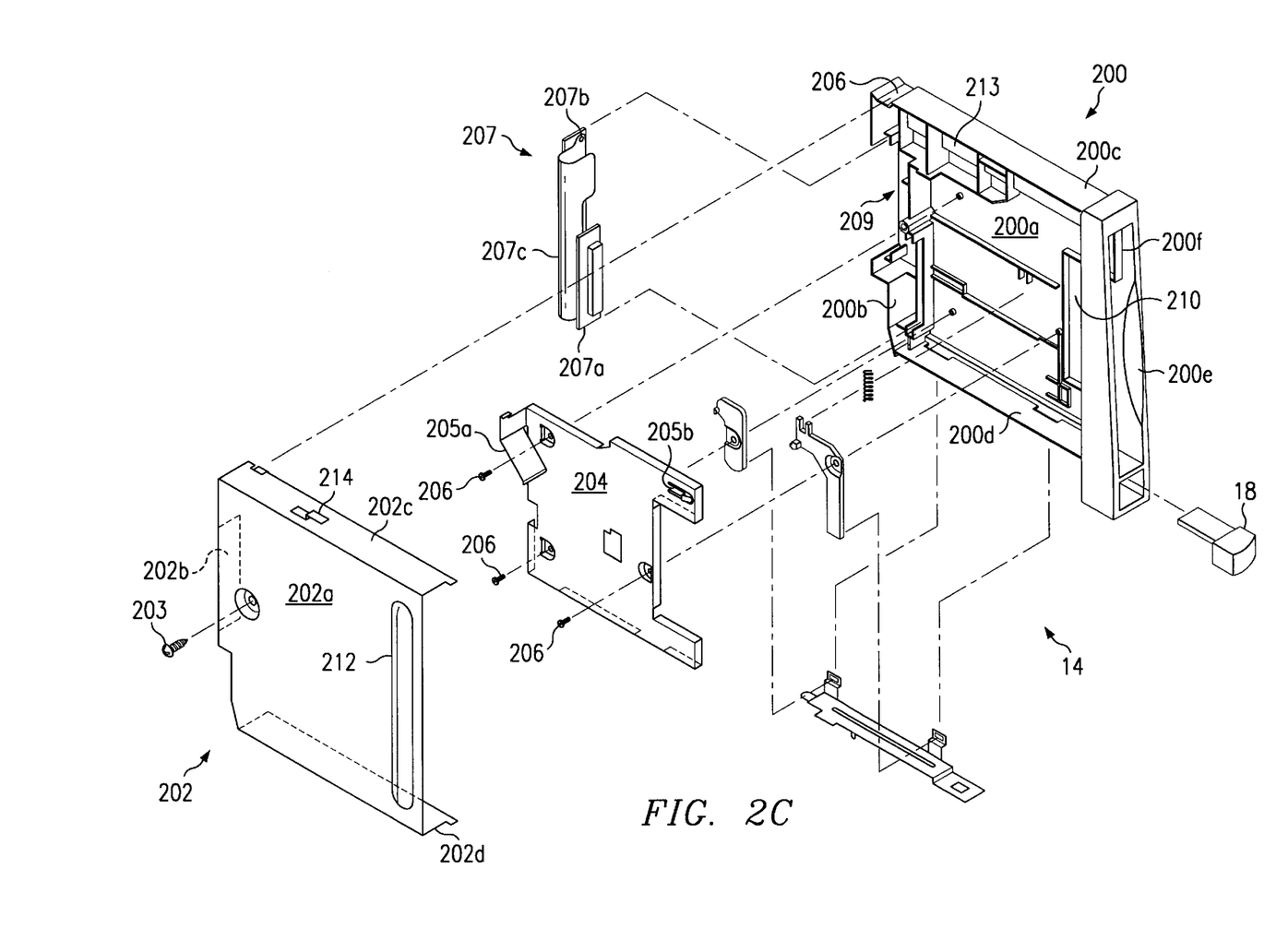
FIG. 2C is an exploded view of the adapter of FIG. 1.
Figure 2D:
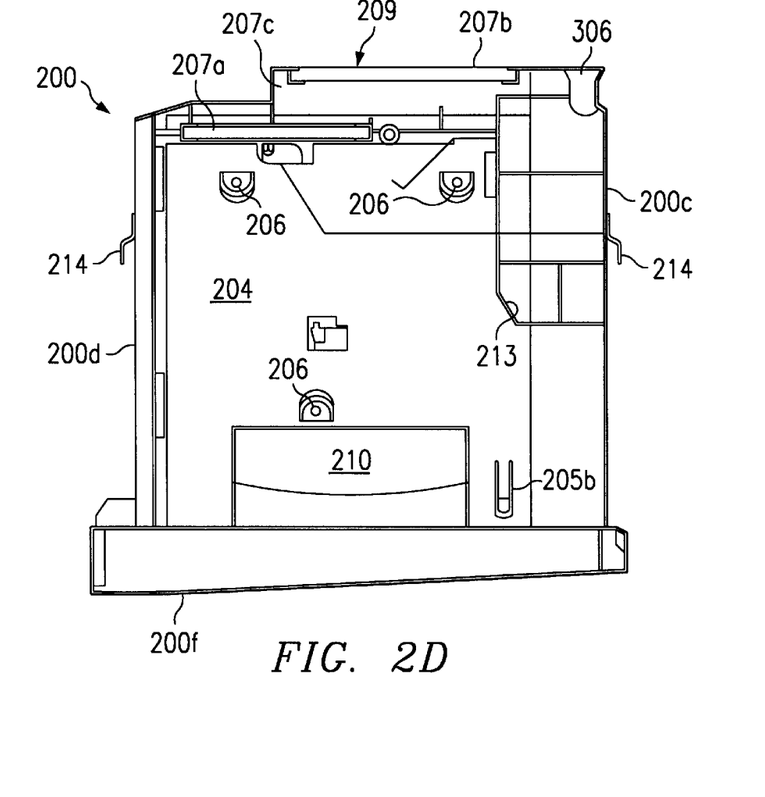
FIG. 2D is a cutaway view of the adapter of FIG. 2A along the line IID—IID.
Figure 3:
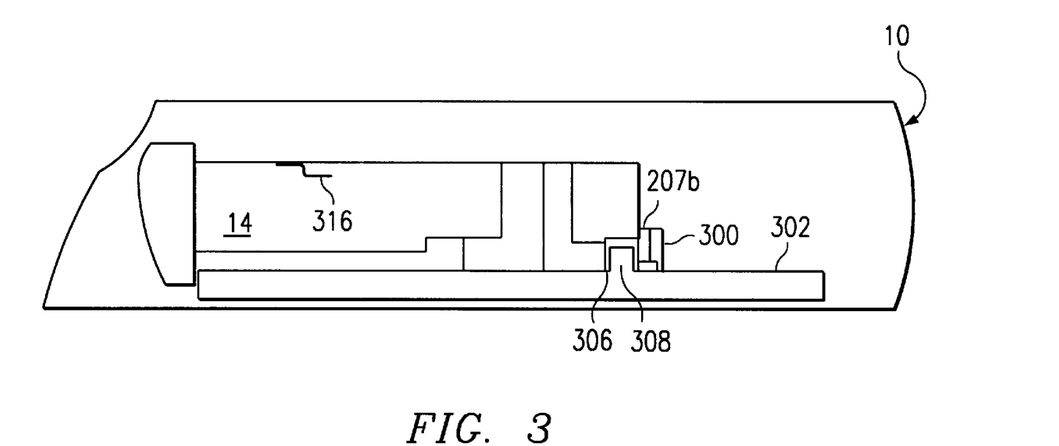
FIG. 3 is a partial right side cutaway view of the docking station of FIG. 1 along the line III—III.
Figure 4:
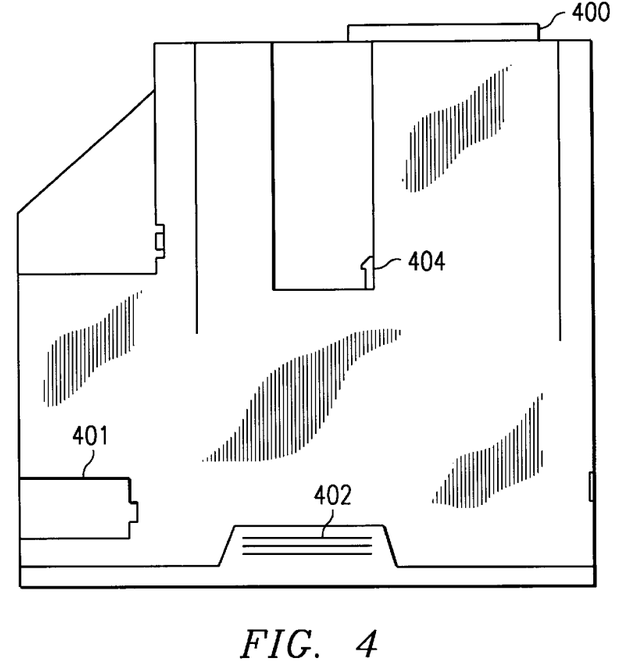
FIG. 4 is a bottom plan view of an FDD media module designed to be retained within the adapter of FIG. 2.

Referring now to FIGS. 2A–2D and 3, a flexible printed circuit ("FPC") 207 is located inside the adapter 14 at the rear thereof and effects an electrical connection between a connector 400 on the rear of the module 16, as shown in FIG. 4, and a corresponding connector 300 on a main board 302 of the docking station 10 and located inside the expansion bay 12 at the rear thereof. In a preferred embodiment, the FPC 207 includes complementary pin connectors 207a and 207b, respectively, connected by a set of conductors 207c in such a manner as to effect the electrical connection of each pin of the module connector 400 (FIG. 4) to a corresponding pin of the docking station connector 300. As illustrated in FIG. 2, the connector 207b projects through an opening 209 in the rear wall 200b for engagement with the connector of the expansion bay 12. It should be noted that the connector 300 of the expansion bay 12 will include 80 or fewer pins for engagement with the connector 207b, depending on the connections that need to be made between the media module 16 and the main board 302 of the docking station.

As best shown in FIGS. 2B and 3, a slot 306 is provided at the rear of the base 200 for receiving an alignment pin 308 provided on the main board 302 for ensuring proper alignment of the adapter 14 within the expansion bay 12. In particular, when the adapter 14 is inserted into the expansion bay 12, the slot 306 and alignment pin 308 cooperate to guide the adapter 14 into the proper orientation within the expansion bay 12.

As previously indicated, the adapter 14 is released from the expansion bay 12 using the ejection mechanism 20. In a preferred embodiment, the ejection mechanism 20 is designed such that the adapter 14 is not completely ejected from the expansion bay 12 upon actuation of the ejection mechanism, so as to prevent the damage to the adapter 14. Accordingly, a finger grip 210 is provided in the base 200 such that, when the adapter 14 is empty, the finger grip 210 is accessible via the aperture 200e and may be employed by a user as a "handle" to pull the adapter 14 completely out of the expansion bay 16. In addition, or as an alternative, to the finger grip 210, a protuberance 212 is provided near the front of the ceiling 202a of the housing cover 202, resulting in a corresponding depression opposite the protuberance 212 on the interior of the ceiling 202a, for enabling the user easily to remove the adapter 14 from the expansion bay 12 by placing his or her fingertips into the depression and pulling the adapter out of the expansion bay 12.

In a preferred embodiment, as best shown in FIG. 2D, an interior wall 212 is provided for preventing a battery module (not shown) from being inserted into the adapter 14 for charging. The wall 212 is positioned such that it does not interfere with the insertion of the particular media module designed to be inserted into the adapter 14, in the illustrated embodiment, an FDD.

As best illustrated in FIGS. 2A and 2B, when the housing cover 202 is connected to the base 200, the left and right side walls 202b, 202c, lie outside the left and right side walls 200c, 200d, such that the left and right side walls 202b, 202c, form the outer left and right side walls of the adapter 14. Similarly, the rear wall portion 202a projects downwardly over the aperture 209 leaving just enough room for the connector 207b to project through.

In another aspect, an EMI spring clip 214 is provided on each of the left and right side walls 202b, 202c, of the cover 202. In the preferred embodiment, the EMI spring clips 214 are beryllium copper leaf springs. The purpose served by the spring clips 214 is two-fold. First, the spring clips 214 serve to suppress EMI emissions by returning signals to main system ground of the docking station 10. In addition, they serve as an additional alignment mechanism for ensuring that the adapter 14 is properly centered within the expansion bay 12. Similarly, as shown in FIG. 3, an additional EMI spring clip 316, identical to the spring clips 214, may be provided on the interior surface of the ceiling 202a of the cover 202 for shortening the signal path from the media module 16 to system ground via the cover 202 and spring clips 214.

FIG. 4 is a bottom plan view of the media module 16. As shown in FIG. 4, the media module 16 also includes a lip 401 and a finger grip 402. When the eject button 18 is depressed, the media module 16 is released from the adapter 14 and, due to the force of the spring 205a on the rear wall thereof, begins to move forward until the lip 401 is caught on the detent 205b provided on the floor cover 204. This prevents the media module 16 from flying out of the adapter 14 and potentially sustaining damage. At that point, the user can complete the removal of the media module 16 from the adapter 14 using the finger grip 402 to grip the media module 16 and pull the module the rest of the way out of the adapter 14.

Figure 5:
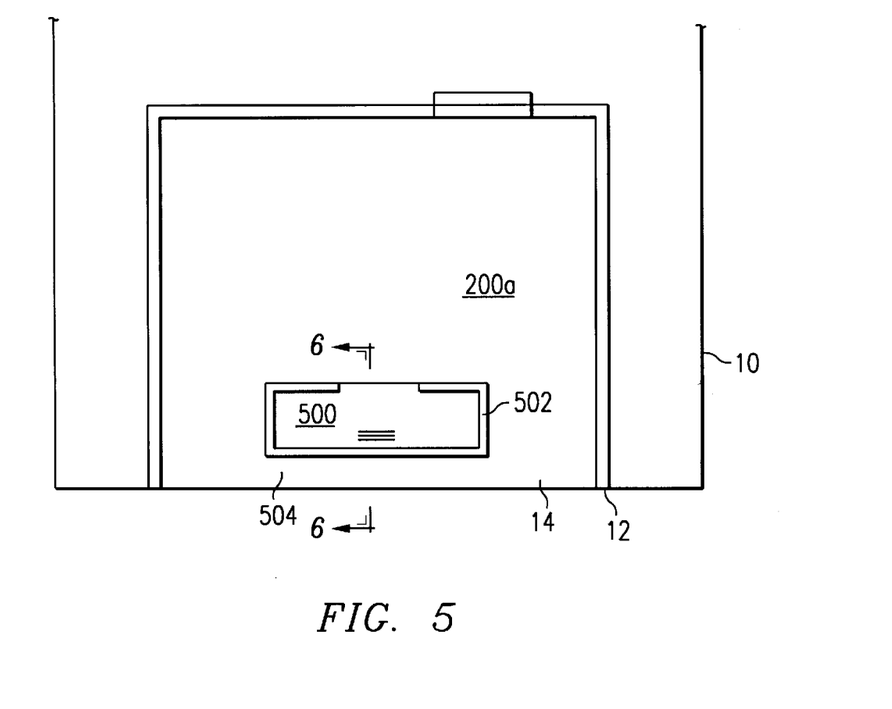
FIG. 5 partial cutaway view of an alternative arrangement of the docking station of FIG. 1 along the line V—V.
Figure 6A:
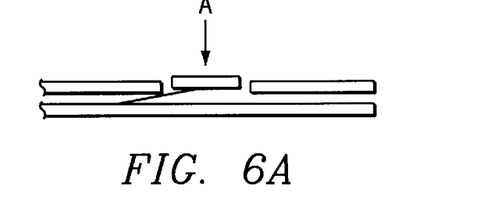
FIGS. 6A and 6B are partial cutaway views of the alternative arrangement of FIG. 5 along the line VI—VI.
Figure 6B:
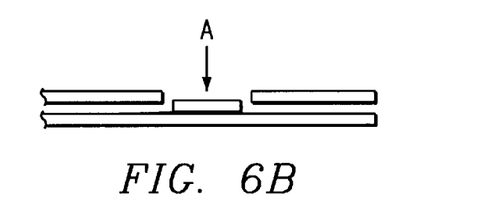

FIG. 5 is a partial cutaway view of the docking station of FIG. 1 illustrating an alternative mechanism for securing the adapter 14 within and releasing and removing the adapter from the expansion bay 16. As shown in FIG. 5, in this alternative embodiment, a spring board 500 is connected to the floor of the expansion bay 16 and is biased toward a first position in which it projects up through a corresponding aperture 502 provided in the base housing portion 200 of the adapter 14, thereby retaining the adapter in position within the expansion bay 16. FIG. 6A is a partial cutaway view of the embodiment shown in FIG. 5 illustrating the first position of the springboard 500 relative to the aperture 502. As illustrated in FIGS. 6A and 6B, to remove the adapter 14 from the expansion bay 16, the user reaches into the adapter and depresses the springboard 500 in a direction indicated by an arrow A using his or her fingers to force the springboard 500 into a second position, as illustrated in FIG. 6B. At this point, the obstruction caused by the springboard 500 is removed and the user is able to pull the adapter out of the expansion bay 16 with his or her fingers through the aperture 502 using a portion 504 of the adapter 14 as a sort of handle.

Figure 7:
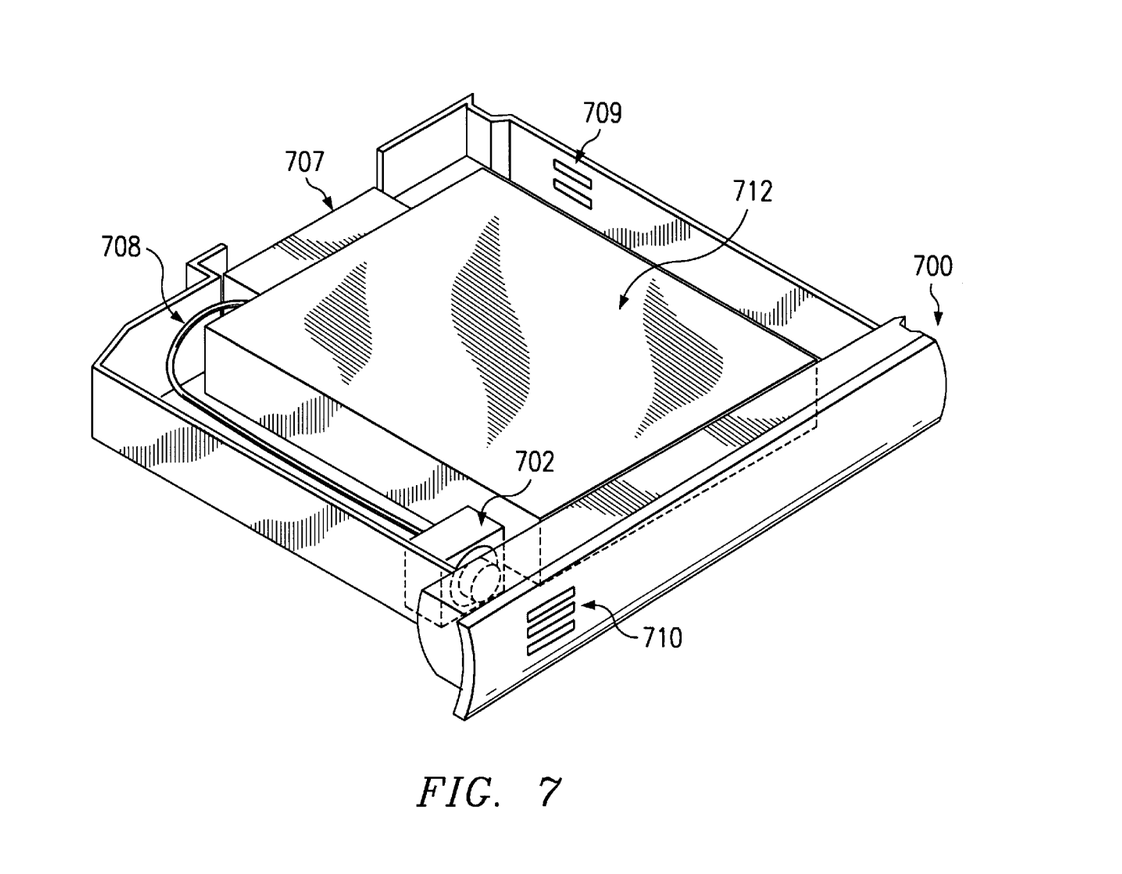
FIG. 7 is a partial cutaway view of an alternative embodiment of a docking station adapter.

FIG. 7 illustrates an alternative embodiment of a docking station adapter 700 for use in connection with the docking station 10 of FIG. 1. As shown in FIG. 7, the adapter 700 includes a DC fan 702 connected to an FPC 707, which is identical to the FPC 207 of FIG. 2 for deriving power therethrough. In one embodiment, the fan 700 may be sealed using plastic walls, a sheet metal top housing and rubber gaskets. Air intake and exhaust vents, respectively designated by reference numerals 708, 710, are also provided, although their respective locations may vary.

It will be recognized that the adapter 700 will be most useful in connection with media modules, such as a media module 712, that consume a great deal of power, and therefore generate a great deal of heat.

Although an illustrative embodiment has been shown and described, other modifications, changes, and substitutions are intended in the foregoing disclosure. Accordingly, it is appropriate that the appended claims be construed broadly and in a manner consistent with the scope of the disclosure.

What is claimed is:

1. A docking station adapter a computer media module to an expansion bay of a computer docking station, the docking station adapter comprising:

a housing comprising a top and a bottom and left, right, front, and rear walls extending between said top and said bottom;

a flexible printed circuit comprising first and second complementary connectors connected by a set of conductors;

a fan for cooling a media module disposed within said housing, wherein said fan is powered via a connection to a main board of said docking station;

air intake and exhaust vents located in one or more of said walls of said housing;

at least one EMI spring clip disposed on a surface said housing;

a springboard flexibly connected to a floor of said expansion bay and extending through an aperture in said bottom, thereby causing an obstruction in said aperture and securing said docking station adapter within said expansion bay;

wherein said first connector is affixed to an interior surface of said rear wall, said first connector removably matingly engaging an obstruction in said aperture and securing said docking station adapter within said expansion bay;

wherein said first connector is affixed to an interior surface of said rear wall, said first connector removably matingly engaging a complimentary connector of said media module; and wherein said second connector is affixed to an exterior surface of said rear wall, said second connector removably matingly engaging a complimentary connector of said docking station disposed within said expansion bay.

2. The docking station adapter of claim 1 further comprising:

an alignment slot for receiving therewithin an alignment pin of said docking station disposed within said expansion bay for guiding said docking station adapter into proper alignment within said expansion bay.

3. The docking station adapter of claim 1 wherein said media module is selected from the group consisting of a floppy disk drive, a CD ROM drive, a ZIP drive, a magneto-optical drive, and a hard disk drive.

4. The docking station adapter of claim 1 further comprising a finger grip disposed on an interior surface of said top.

5. The docking station adapter of claim 1 further comprising a finger grip disposed on an interior surface of said bottom.

6. The docking station adapter of claim 1 further comprising a first finger grip disposed on an interior surface of said top and a second finger grip disposed on an interior surface of said bottom.

7. The docking station adapter of claim 1 further comprising a floor cover disposed within said housing between and parallel to said top and said bottom, said floor cover having a detent on a top surface thereof for retaining a lip disposed on a bottom of said media module when said media module is ejected from said adapter.

8. The docking station adapter of claim 1 further comprising a spring mechanism disposed inside said housing proximate said rear wall for urging said media module toward an opening in a front wall of said docking station adapter.

9. The docking station adapter of claim 1 further comprising a interior wall disposed within said housing for preventing a battery module from being inserted into said housing.

10. The docking station adapter of claim 1 further comprising an EMI spring clip disposed on an exterior surface of each of said left and right walls.

11. The docking station adapter of claim 1 further comprising an EMI spring clip disposed on an interior surface of said top.

12. The docking station adapter of claim 1 wherein EMI spring clips comprise beryllium copper leaf springs.

13. The docking station adapter of claim 1 wherein depression of said springboard through said aperture removes said obstruction and enables said docking station adapter to be removed from said expansion bay.

14. A computer docking station assembly comprising:

an expansion bay;

a media module; and a docking station adapter comprising:

a housing comprising a top and a bottom and left, right, front, and rear walls extending between said top and said bottom;

a flexible printed circuit comprising first and second complementary connectors connected by a set of conductors;

a fan for cooling a media module disposed within said housing, wherein said fan is powered via a connection to a main board of said docking station;

air intake and exhaust vents located in one or more of said walls of said housing;

an EMI spring clip disposed on a surface of said housing;

a springboard flexibly connected to a floor of said expansion bay and extending through an aperture in said bottom, thereby causing an obstruction in said aperture and securing said docking station adapter within said expansion bay;

wherein said first connector is affixed to and interior surface of said rear wall, said first connector removably matingly engaging a complimentary connector or said media module; and wherein said second connector is affixed to an exterior surface of said rear wall, said second connector removably matingly engaging a complimentary connector of a said docking station disposed within said expansion bay.

15. The assembly of claim 14 wherein said docking station adapter of claim 1 further comprises an alignment slot for receiving therewithin an alignment pin of said docking station disposed within said expansion bay for guiding said docking station adapter into proper alignment within said expansion bay.

16. The assembly of claim 14 wherein said media module is selected from the group consisting of a floppy disk drive, a CD ROM drive, a ZIP drive, a magneto-optical drive, and a hard disk drive.

17. The assembly of claim 14 further comprising a finger grip disposed on an interior surface of said top.

18. The assembly of claim 14 further comprising a finger grip disposed on an interior surface of said bottom.

19. The assembly of claim 14 further comprising a first finger grip disposed on an interior surface of said top and a second finger grip disposed on an interior surface of said bottom.

20. The assembly of claim 14 further comprising a floor cover disposed within said housing between and parallel to said top and said bottom, said floor cover having a detent on a top surface thereof for retaining a lip disposed on a bottom of said media module when said media module is ejected from said adapter.

21. The assembly of claim 14 further comprising a spring mechanism disposed inside said housing proximate said rear wall for urging said media module toward an opening in a front wall of said docking station adapter.

22. The assembly of claim 14 further comprising a interior wall disposed within said housing for preventing a battery module from being inserted into said housing.

23. The assembly of claim 14 further comprising an EMI spring clip disposed on an exterior surface of each of said left and right walls.

24. The assembly of claim 14 further comprising an EMI spring clip disposed on an interior surface of said top.

25. The docking station adapter of claim 14 wherein EMI spring clips comprise beryllium copper leaf springs.

26. The assembly of claim 14 further comprising a springboard flexibly connected to a floor of said expansion bay and extending through an aperture in said bottom, thereby causing an obstruction in said aperture and securing said docking station adapter within said expansion bay.

27. The assembly of claim 14 wherein depression of said springboard through said aperture removes said obstruction and enables said docking station adapter to be removed from said expansion bay.

28. A method of adapting a media module to an expansion bay of a docking station, the method comprising:

inserting a docking station adapter into said expansion bay, said docking station adapter comprising a housing configured to receive said media module therein, a first connector affixed to an interior surface of a rear wall of said housing and a complementary second connector affixed to an exterior surface of said rear wall of said housing and electrically connected to said first connector via a set of conductors, such that when said docking station adapter is inserted into said expansion bay, said second connector matingly engages a connector of said expansion bay;

inserting said media module into said docking station adapter such that a connector of said media module matingly engages said first connector of said docking station adapter;

securing said docking station adapter within said expansion bay; and securing said media module within said docking station adapter providing a cooling fan within said docking station adapter for cooling said media module, wherein said fan is powered via a connection to a main board of said docking station-two;

providing means for aligning said docking station adapter within said expansion bay;

providing an EMI spring clip on a surface of said housing;

wherein said securing said docking station adapter within said expansion bay comprises providing a springboard flexibly connected to a floor of said expansion bay, wherein a portion of said springboard projects through and provides an obstruction within an aperture through a floor of said docking station adapter, thereby securing said docking station within said expansion bay.

29. The method of claim 28 further comprising ejecting said media module from said docking station adapter and then ejecting said docking station adapter from said expansion bay.

30. The method of claim 29 further comprising, subsequent to said ejecting said media module, using a finger grip on said media module to remove said docking station adapter.

31. The method of claim 29 further comprising, subsequent to said ejecting said docking station adapter, using a finger grip disposed on an interior of said docking station adapter to remove said docking station adapter from said expansion bay.

32. The method of claim 28 further comprising providing an EMI spring clip on an exterior surface of each of a left and right side wall of said docking station.

33. The method of claim 28 further comprising providing an EMI spring clip on an interior surface of a top of said docking station.

34. The method of claim 28 further comprising removing said docking station adapter from said expansion bay by:

depressing said springboard portion projecting through said aperture; and pulling said docking station adapter out of said expansion bay using a portion of said docking station adapter floor in front of said aperture as a handle.

* * * * *

UNITED STATES PATENT AND TRADEMARK OFFICE
CERTIFICATE OF CORRECTION

| | | |
|---|---|---|
| PATENT NO. | : 6,011,687 | Page 1 of 1 |
| DATED | : January 4, 2000 | |
| INVENTOR(S) | : Steve Gluskoter, Ed Cline, Ed Tinsley, Orin M. Ozias, Bryan Howell, Bryan Hunter and Damon Broder | |

It is certified that error appears in the above-identified patent and that said Letters Patent is hereby corrected as shown below:

Column 2,
Line 62, please delete the word "DESCRIOTION" and insert therefor
-- DESCRIPTION --

Column 3,
Line 10, please insert the word -- is -- after "FIG 5".

Column 4,
Line 6, please remove bold type from the number "80".
Line 37, please delete "212" and insert therefor -- 213 --.
Line 39, please delete "212" and insert therefor -- 213 --.

Column 5,
Line 50, please insert the words -- for adapting -- after "docking station adapter".

Signed and Sealed this

Twenty-second Day of October, 2002

*Attest:*

JAMES E. ROGAN
*Attesting Officer*     *Director of the United States Patent and Trademark Office*